Feb. 15, 1949.                S. D. JARRETT                2,461,983
                         WHEEL SPACER FOR TRACTORS
Filed April 23, 1946                                    2 Sheets-Sheet 1
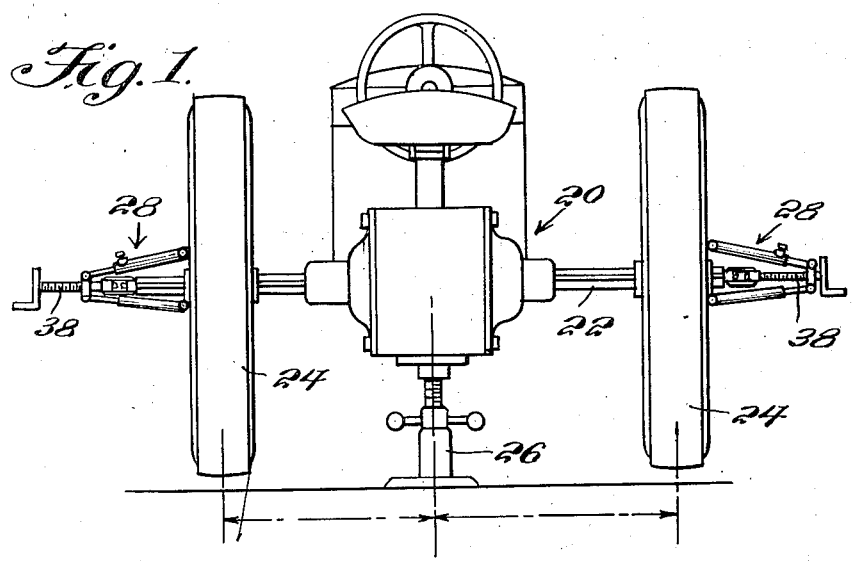
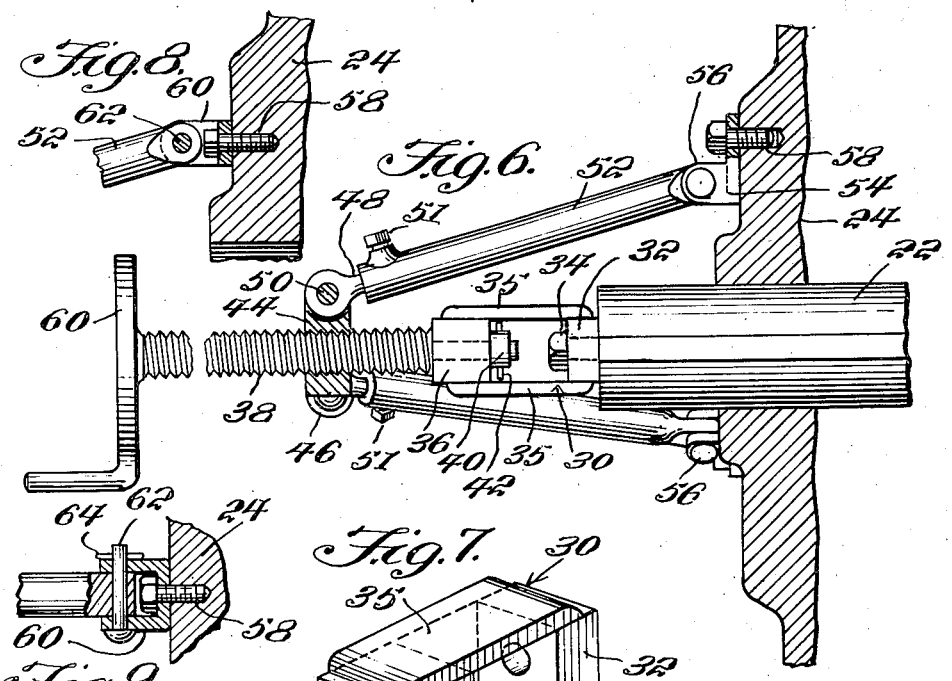
INVENTOR.
Samuel D. Jarrett,
BY Victor J. Evans & Co.
ATTORNEYS

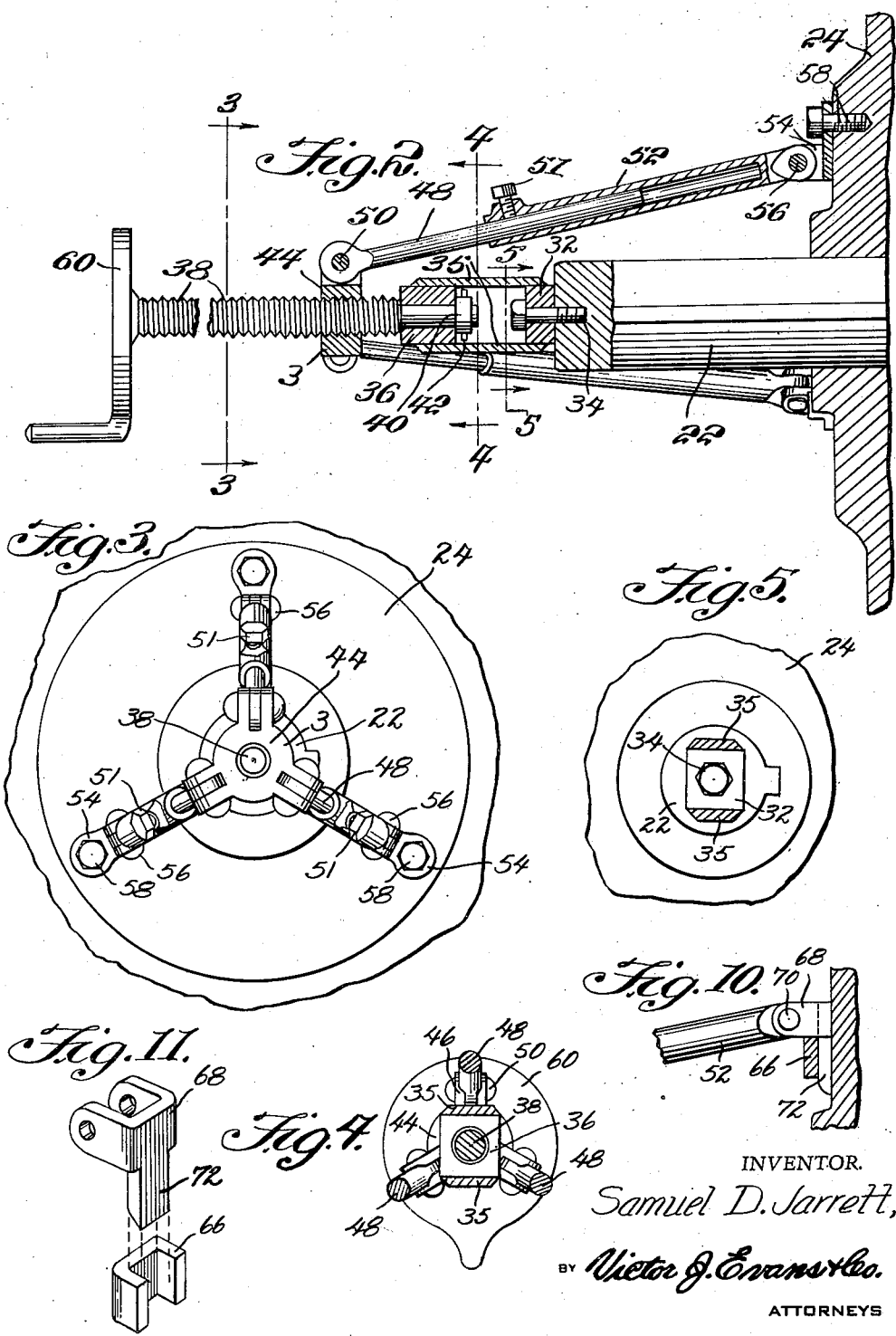

Patented Feb. 15, 1949

2,461,983

UNITED STATES PATENT OFFICE 2,461,983

WHEEL SPACER FOR TRACTORS

Samuel D. Jarrett, Duncan, Okla.

Application April 23, 1946, Serial No. 664,199½

1 Claim. (Cl. 29—261)

This invention relates to a wheel spacer for tractors.

An object of this invention is to provide a device which will eliminate the hard work and to save time in setting the wheels of a row crop type tractor for different widths of rows desired.

The device after the wheels have been spaced as desired is removed and can be stored in some convenient location.

The present method used to space wheels is by a crow-bar and hammer, and requires the services of at least two men, and constitutes a long hand job.

Another object of this invention therefore is to provide a device whereby one man can space the wheels in a short time.

A further object of the invention is to provide a device that will eliminate wear and tear on the axle caused by the old method of spreading and pulling wheels.

With the above and other objects and advantages in view the invention consists of the novel details of construction, arrangement and combination of parts more fully hereinafter described, claimed and illustrated in the accompanying drawings in which:

Figure 1 is an elevational view of an embodiment of the invention in operational position on the axle of a row-crop tractor.

Figure 2 is an enlarged detailed view partly in section thereof.

Figure 3 is a view looking in the direction of the arrows on the line 3—3 of Figure 2.

Figure 4 is a view looking in the direction of the arrows on the line 4—4 of Figure 2.

Figure 5 is the same on the line 5—5 of Figure 2.

Figure 6 is a full elevational view of the device.

Figure 7 is a perspective view of the axle attaching member.

Figure 8 is a modified form of attachment to the tractor wheel.

Figure 9 is a sectional view of the same.

Figure 10 is another modification of the same, and

Figure 11 is a perspective view of the modification in Figure 10.

Referring more in detail to the drawings the reference numeral 20 designates a row-crop tractor having the axle 22 and drive wheels 24 mounted thereon.

In Figure 1 the tractor is shown with the wheels 24 raised from the ground by use of a jack 26 whereby the wheels may be spaced with the spacer which is generally designated by the numeral 28.

The spacer comprises an axle attaching member 30 having an apertured block 32 for connection to the axle 22 of the tractor by a bolt 34. Parallel opposed plates 35 are welded at one of their ends to the block 32 and at the other of their ends to the screw mounting block 36 in which is rotatably mounted the end of the screw 38 and a collar 40 and cotter pin 42 retains the screw in position in the block 36.

Mounted on the screw 38 is a collar 44 having apertured ears 46 thereon to pivotally receive the arms 48 therein. The arms 48 are pivoted by means of the pins 50. Tubular sleeves 52 are adjustably mounted on the arms 48 and set screws 51 therein retain the arms and sleeves in fixed relation to each other.

In Figure 6 the sleeves are connected to brackets 54 by means of pins 56 and the brackets are connected to the wheel 24 by bolts 58.

To push the wheel toward the tractor or pull the wheel toward the end of the tractor the screw is rotated by the hand wheel 60 which is welded on the end of the screw.

The device gives a steady pull which saves wear and tear on the splines or keyways of the axle and prevents binding of the axle in the wheel at any time.

In Figures 8 and 9 the bracket 60 is secured to the wheel by a bolt 58 which is positioned directly at the end of the sleeve 52, and the bracket is connected to the sleeve 52 by a pin 62 which is retained in position by the cotter key 64. Thus the pin enters the bracket at the center rather than at the side thereof as shown in Figure 6.

In Figures 10 and 11 a U-shaped bracket 66 is welded to the wheel and the bracket 68 connected to the sleeve by a pin 70 has an arm 72 which fits into the bracket and thus quickly and easily connects the sleeves 52 to the wheel.

It is believed that the operation of the device will be apparent to those skilled in the art and it is to be understood that various changes in the details of construction and arrangement of parts may be resorted to without departing from the spirit of the invention or the scope of the appended claim.

Having thus described the invention what is claimed as new and desired to be obtained by Letters Patent is:

A device of the character described, comprising an axle attaching member, parallel opposed plates fixed at their ends to said member, a mounting block fixed to the opposite ends of the plates in alinement with said member, a screw rotatably mounted in and retained in said block, a collar threadably mounted on said screw, apertured ears on said collar, longitudinally adjustable arms pivotally connected to said collar, brackets on the ends of said arms adapted to be connected to a wheel mounted on said axle whereby movement of said screw will move the wheel backward and forward on said axle.

SAMUEL D. JARRETT.

REFERENCES CITED

The following references are of record in the file of this patent:

UNITED STATES PATENTS

| Number | Name | Date |
|---|---|---|
| 1,462,843 | Ainsworth | July 24, 1923 |
| 1,468,976 | Rickart | Sept. 25, 1923 |
| 1,873,284 | Cosgrove | Aug. 23, 1932 |
| 2,005,534 | Cornwell | June 18, 1935 |
| 2,118,754 | Bergert | May 24, 1938 |

FOREIGN PATENTS

| Number | Country | Date |
|---|---|---|
| 23,207 | Great Britain | Oct. 19, 1906 |
| 300,032 | Great Britain | Nov. 8, 1928 |
| 493,498 | Great Britain | Oct. 10, 1938 |